US012572702B2

(12) United States Patent
Chhabra et al.

(10) Patent No.: US 12,572,702 B2
(45) Date of Patent: Mar. 10, 2026

(54) BYPASSING MEMORY ENCRYPTION FOR NON-CONFIDENTIAL VIRTUAL MACHINES IN A COMPUTING SYSTEM

(71) Applicant: Intel Corporation, Santa Clara, CA (US)

(72) Inventors: Siddhartha Chhabra, Portland, OR (US); Raghunandan Makaram, Northborough, MA (US); Barry Huntley, Hillsboro, OR (US); Hisham Shafi, Akko (IL); Hormuzd Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 851 days.

(21) Appl. No.: 17/693,230

(22) Filed: Mar. 11, 2022

(65) Prior Publication Data

US 2023/0289479 A1     Sep. 14, 2023

(51) Int. Cl.
*G06F 21/72*          (2013.01)
(52) U.S. Cl.
CPC .................................... *G06F 21/72* (2013.01)
(58) Field of Classification Search
CPC ...................................................... G06F 21/72
USPC ......................................................... 713/190
See application file for complete search history.

(56) References Cited

U.S. PATENT DOCUMENTS

| | | | | |
|---|---|---|---|---|
| 9,893,881 | B2 * | 2/2018 | Bhattacharyya | ........ G06F 21/57 |
| 10,372,628 | B2 * | 8/2019 | Chhabra | ............. G06F 12/1466 |
| 10,810,138 | B2 * | 10/2020 | Edirisooriya | ......... G06F 3/0634 |
| 11,763,008 | B2 * | 9/2023 | Sawan | ................... H04L 9/0894 |
| | | | | 713/190 |
| 2017/0063532 | A1 * | 3/2017 | Bhattacharyya | ........ G06F 21/76 |
| 2019/0042474 | A1 * | 2/2019 | Edirisooriya | ......... G06F 3/0634 |
| 2019/0042783 | A1 * | 2/2019 | Guim Bernat | ........ H04L 9/0894 |
| 2019/0087575 | A1 * | 3/2019 | Sahita | ..................... G06F 21/71 |
| 2019/0102322 | A1 * | 4/2019 | Chhabra | ............. G06F 12/1408 |
| 2019/0155754 | A1 * | 5/2019 | Kida | ...................... G06F 21/606 |
| 2021/0006395 | A1 * | 1/2021 | Durham | ................ H04L 9/0861 |
| 2021/0064546 | A1 * | 3/2021 | Zmudzinski | ........ G06F 12/1063 |
| 2021/0216476 | A1 * | 7/2021 | Sawan | ................... H04L 9/0861 |

(Continued)

FOREIGN PATENT DOCUMENTS

EP          3457311 A1     3/2019

OTHER PUBLICATIONS

European Search Report and Search Opinion, EP App. No. 23155963.4, Jul. 27, 2023, 10 pages.

(Continued)

*Primary Examiner* — Thanh T Le
(74) *Attorney, Agent, or Firm* — Nicholson De Vos Webster & Elliott LLP

(57)          ABSTRACT

A processor includes a first model specific register (MSR); and memory encryption circuitry to receive a request to access a memory, determine if a key identifier (ID) of the request is zero, and if the key ID is zero, to bypass data encryption when the request is to write data to the memory and to bypass memory decryption when the request is to read data from the memory and when a selected bit of the first MSR is set, and if the selected bit of the first MSR is not set, to encrypt write data when the request is to write data or decrypt data in a read response when the request is to read data, with a key associated with the key ID equal to zero.

20 Claims, 13 Drawing Sheets

(56) References Cited

U.S. PATENT DOCUMENTS

| | | | |
|---|---|---|---|
| 2021/0216645 A1* | 7/2021 | Sawan | .................. G06F 21/602 |
| 2021/0409209 A1* | 12/2021 | Chhabra | .............. H04L 9/0877 |

OTHER PUBLICATIONS

Intel, "Intel Architecture Memory Encryption Technologies", Specification, Document No. 336907-003US, Revision 1.3, Apr. 1, 2021, 33 pages.

* cited by examiner

TME CAPABILITY MSR   116

| BIT | MEANING |
|---|---|
| 0 | AES-XTS 128-BIT ENCRYPTION ALGORITHM FOR BOTH TME AND MK-TME |
| 1 | AES-XTS 128-BIT ENCRYPTION ALGORITHM WITH AT LEAST 28B SHA-3 BASED INTEGRITY |
| 2 | AES-XTS 256-BIT ENCRYPTION ALGORITHM FOR BOTH TME AND MK-TME |
| 3 | AES-XTS 256-BIT ENCRYPTION ALGORITHM WITH AT LEAST 28B SHA-3 BASED INTEGRITY |
| 15:4 | RESERVED FOR ENCRYPTION ALGORITHMS |
| 30:16 | RESERVED FOR FUTURE USE |
| 31 | TME ENCRYPTION BYPASS SUPPORTED |
| 35:32 | MK_TME_MAX_KEYID_BITS |
| 50:36 | MK_TME_MAX_KEYS |
| 63:51 | RESERVED |

TME ACTIVATE MSR   118

| BIT | MEANING |
|---|---|
| 0 | LOCK (READ ONLY) |
| 1 | HARDWARE ENCRYPTION ENABLE 502 |
| 2 | KEY SELECT<br>0 : NEW KEY<br>1 : STANDBY RESTORE |
| 3 | SAVE KEY FOR STANDBY |
| 7:4 | POLICY |
| 30:8 | RESERVED |
| 31 | TME ENCRYPTION BYPASS ENABLE 504 |
| 35:32 | MK_TME_KEYID_BITS |
| 39:36 | TDX_HKID_THRESHOLD |
| 63:48 | MK_TME_AG_ENABLE |

FIG. 5

BYPASSING MEMORY ENCRYPTION FOR NON-CONFIDENTIAL VIRTUAL MACHINES IN A COMPUTING SYSTEM

BACKGROUND

Embodiments described herein generally relate to virtualization and memory encryption. In particular, embodiments described herein generally relate to bypassing memory encryption for non-confidential virtual machines in a computing system.

Modern processing devices employ disk encryption to protect data at rest. However, data in memory is in plaintext and vulnerable to attacks. Attackers can use a variety of techniques including software and hardware-based bus scanning, memory scanning, hardware probing etc. to retrieve data from memory. This data from memory could include sensitive data for example, privacy-sensitive data, intellectual property-sensitive data, cryptographic keys used for file encryption or communication, and the like. Moreover, a current trend in computing is the movement of data and enterprise workloads into the cloud by utilizing virtualization-based hosting services provided by cloud service providers (CSPs). This further exacerbates the exposure of the data. Customers or so-called tenants of the CSPs are requesting better security and isolation solutions for their workloads. Specifically, customers are seeking solutions that enable the operation of CSP-provided software outside of a Trusted Computing Base (TCB) of the tenant's software. The TCB of a system refers to a set of hardware, firmware, and/or software components that have an ability to influence the trust for the overall operation of the system.

In some cases, encryption of the data in memory is desired. In other cases where the data is non-confidential, encrypting the data in memory results in decreased system performance.

BRIEF DESCRIPTION OF DRAWINGS

Various examples in accordance with the present disclosure will be described with reference to the drawings, in which:

FIG. 4 is a diagram of a total memory encryption capability register according to one implementation.

FIG. 5 is a diagram of a total memory encryption activation register according to one implementation.

DETAILED DESCRIPTION

Figure 1:
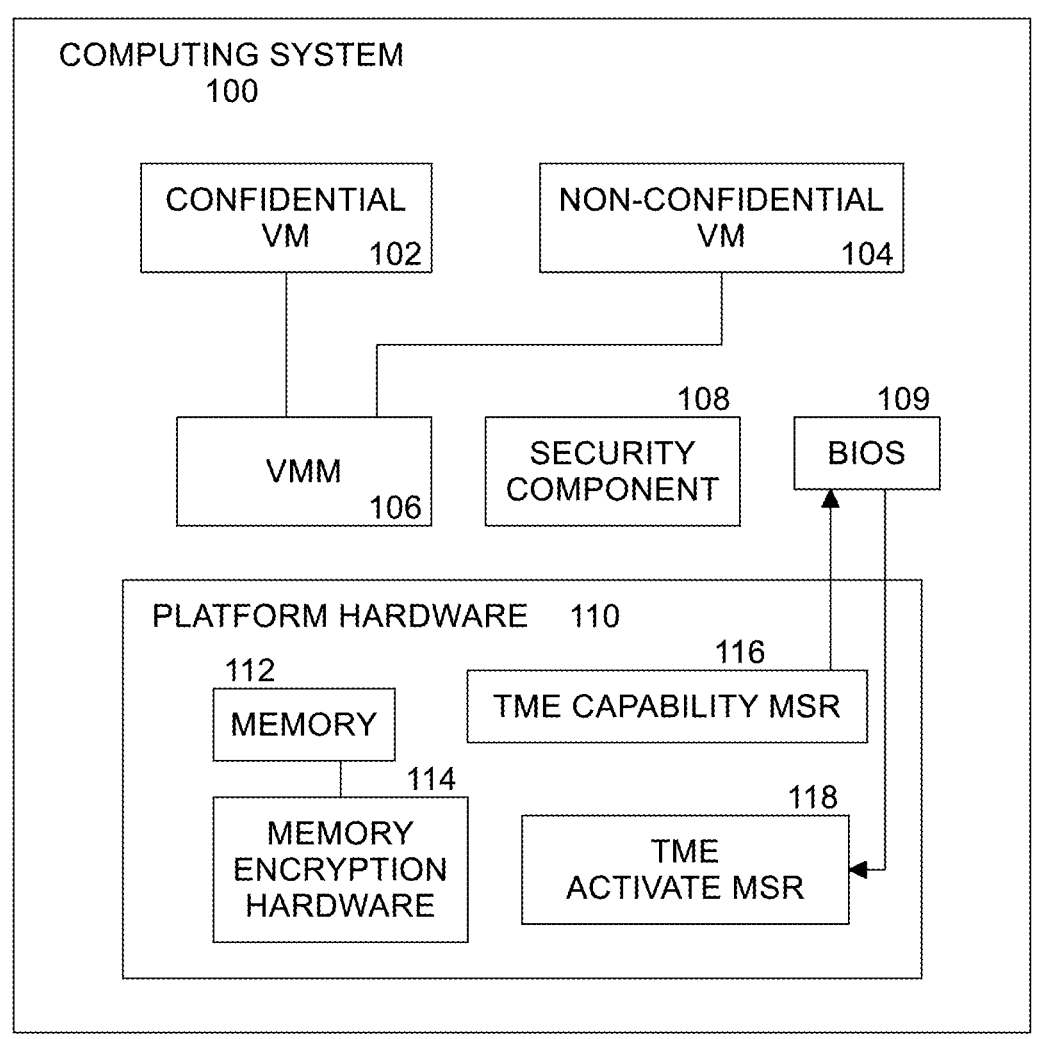
FIG. 1 is a block diagram illustrating an example computing system that provides bypassing of memory encryption in virtualized systems using trust domains according to one implementation.

The present disclosure relates to methods, apparatus, systems, and non-transitory computer-readable storage media for bypassing total memory encryption (TME) for memory data accessed by non-confidential virtual machines (VMs). This allows non-confidential VMs to run at a same performance as VMs running on unprotected computing systems, while still providing a desired level of protection (e.g., providing encryption and integrity of data in memory) for confidential VMs.

In the following description, numerous specific details are set forth (e.g., specific application binary interface (ABI) primitives, specific operations and sequences of operations, specific Intel® Trust Domain Extensions (TDX) implementation details, and the like). However, embodiments may be practiced without these specific details. In other instances, well-known circuits, structures and techniques have not been shown in detail to avoid obscuring the understanding of the description.

Cloud security providers (CSPs), driven by their customers' requirements, desire cryptographic isolation for customer workloads running on their computing platforms. In some implementations, cryptographic isolation may be provided by Secure Memory Encryption (SME) and Secure Encrypted Virtualization (SEV) from Advanced Micro Devices, Inc. (AMD) to meet these requirements for the cloud providers. In other implementations, cryptographic isolation may be provided by TDX from Intel® Corporation for providing such isolation on servers and removing CSP software (e.g., VMM) from the trust boundary. TDX provides cryptographic isolation for customer workloads in a cloud computing environment using a multi-key (MK) total memory encryption engine (TME)(MK-TME), which provides both confidentiality and integrity. While the cryptographic mechanisms implemented in the MKTME engine circuitry are used to provide confidentiality and integrity to trust domain (TD) data, they impose additional performance overheads. Some confidential cloud computing environments run both confidential and non-confidential workloads and on the same computing hardware. CSPs can charge extra for confidential VMs, while maintaining the cost for non-confidential VMs. Hence, any additional overhead when providing non-confidential VMs results in increased total cost of ownership (TCO) for the CSPs.

In the current TDX architecture, when TDX is enabled, TME is enabled by default, which results in the computing hardware (e.g., MK-TME engine circuitry) encrypting all memory. This has a negative impact on the performance of non-confidential VMs, resulting in a TCO increase for the CSP. The technology described herein discloses an architectural mechanism to de-couple memory encryption from TDX (or other cryptographic isolation solutions, such as SME and SEV), thereby enabling allowing non-confidential VMs to run at the same performance level as an unprotected system while providing the desired protection (e.g., encryption and integrity of data in memory) for confidential VMs. This technology also applies to Software Guard Extensions (SGX) from Intel® Corporation and MKTME in standalone modes of operation. With the current architecture, SGX requires encryption of all memory, thereby resulting in performance overheads for all workloads running on the computing platform where SGX is enabled. The technology described herein allows SGX to be enabled without imposing overheads on rest of the workloads (e.g., on non-confidential workloads).

FIG. 1 is a block diagram illustrating an example computing system 100 that provides bypassing of memory encryption in virtualized systems using trust domains according to one implementation. Computing system 100 may represent a server (e.g., a virtualization server like the virtualization server 200 of FIG. 2), or other computer systems similar to those disclosed herein. In general, computing system 100 represents any computing platform on which virtual machines may be run. Computing system 100 includes platform hardware 110. Examples of such platform hardware include processing cores, caches, registers, translation lookaside buffers (TLBs), memory management units (MMUs), other processor hardware, input/output (I/O) devices, main memory, secondary memory, other system-level hardware, and other hardware found in processors and computer systems (e.g., as shown in the other processors and computer systems described below).

Computing system 100 has a virtual machine (VM) manager (VMM) 106. A VMM is sometimes referred to as a hypervisor. In some computing systems, the VMM is provided by the CSP operating the computing system. The VMM may create and manage one or more VMs, including confidential VM 102 and non-confidential VM 104, in ways that are known in the art. Confidential VM 102 is a VM whose data is intended to be protected in memory in a confidential manner (e.g., by encryption) by computing system 100. Non-confidential VM 104 is a VM whose data is not intended to be protected in a confidential manner (e.g., by encryption) by computing system 100.

Computing system 100 includes security component 108. In various embodiments, the security component 108 may be one or more security-services modules (e.g., Intel® Trust Domain Extensions (TDX) modules, AMD SME and/or SEV modules), security processors (e.g., platform security processors), processor microcode, one or more security firmware components, or other security components. The security components may be implemented in hardware, firmware, software, or any combination thereof. Security component 108 may be operative to provide protection or security to VMs running on computing system 100, including confidential VM 102 and non-confidential VM 104. In some embodiments, this may include protecting the VMs from software not within the trusted computing base (TCB) of the protected VMs, including VMM 106. Such approaches may rely on encryption, hardware isolation, or other approaches. As used herein, a protected VM may represent an encrypted, isolated, or otherwise protected VM whose state is not accessible to the VMM 106.

Security component 108 may use different types of approaches to protect the VMs 102, 104. One example of such an approach is a VM using Multi-Key Total Memory Encryption (MKTME), which uses encryption to protect the data and code of the VM. MKTME supports TME in that MKTME allows software to use one or more or separate keys for encryption of volatile or persistent memory. Another example is a trust domain (TD) in TDX, which uses both encryption, integrity protection, and hardware isolation to protect the data and code of the VM against software and hardware attacks from elements outside the TCB. When MKTME is used with TDX, it provides confidentiality via separate keys for memory contents of different TDs such that the TD keys cannot be operated upon by the untrusted VMM 106. MKTME may be used with or without TDX. A TD is an example of an encrypted and hardware isolated VM. Another example is an encrypted VM in SEV, which uses encryption to protect the data and code of the VM. Yet another example is an encrypted VM in SEV Secure Nested Paging (SEV-SNP) from AMD, which uses encryption and hardware isolation to protect the data and code of the VM. One more example is a secure enclave in SGX, which uses encryption, hardware isolation, replay protections, and other protections to protect code and data of a secure enclave. Each of MKTME, TDX, SEV, SEV-SNP, and SGX may provide encrypted workloads (VMs or applications) with pages that are encrypted with a key that is kept secret in hardware from the VMM, hypervisor or host operating system (OS). These are just a few examples. Those skilled in the art, and having the benefit of the present disclosure, will appreciated that the embodiments disclosed herein may also be applied to other techniques known in the art or developed in the future.

Generally, security component 108 provides the same level of protection for all VMs running in computing system 100. However, in some scenarios, there may be one or more VMs that do not need that level of protection. For example, confidential VM 102 may need a first level of protection that includes encryption of memory accessed by the confidential VM. However, non-confidential VM 104 may only need a second level of protection, less than the first level of protection, which does not include encryption of memory accessed by the non-confidential VM.

In an implementation, platform hardware 110 includes basic input/output (I/O) system (BIOS) 109, memory encryption hardware 114 to provide encryption of memory 112 for confidential VM 102 and bypassing of memory encryption for non-confidential VM 104 using total memory encryption (TME) capability model specific register (MSR) 116 and TME activate MSR 118 as described below.

As discussed above, in some embodiments, the protected VMs may be TDs in TDX. TDX extends Virtual Machines Extensions (VMX) and MKTME with a virtual machine guest called a TD. A TD runs in a central processing unit (CPU) mode which protects the confidentiality of the TD's memory contents and the TD's CPU state from any other software, including VMM 106, unless explicitly shared by the TD itself. TDX is built on top of Secure Arbitration Mode (SEAM), which is a CPU mode and extension of the VMX instruction set architecture (ISA). The TDX module, running in SEAM mode, serves as an intermediary between VMM 106 and the guest TDs. VMM 106 is expected to be TDX-aware. VMM 106 can launch and manage both guest TDs and legacy guest VMs. VMM 106 may maintain legacy functionality from the legacy VMs perspective. The VMM may be restricted regarding the TDs managed by the VMM.

TDX may help to provide confidentiality (and integrity) for customer (tenant) software executing in an untrusted CSP infrastructure. The TD architecture, which can be a System-on-Chip (SoC) capability, provides isolation between TD workloads and CSP software, such as a VMM 106 of the computing system 100 managed by a CSP. Components of the TD architecture may include 1) memory encryption via a MKTME engine, 2) a resource management capability such as a VMM, and 3) execution state and memory isolation capabilities in a processor of platform hardware 110 provided via a TDX-module-managed Physical Address Metadata Table (PAMT) and via TDX-module-enforced confidential TD control structures. The TD architecture provides an ability of a processor to deploy TDs that leverage the MKTME engine, the PAMT, the Secure (integrity-protected) Extended Page Table (SEPT) and access-controlled confidential TD control structures for secure operation of TD workloads.

In one implementation, the tenant's software is executed in a TD. This TD (also referred to as a tenant TD) refers to a tenant workload (which can comprise an OS alone along with other ring-3 applications running on top of the OS, or a VM running on top of VMM 106 along with other ring-3 applications, for example). Each TD may operate independently of other TDs in the system and may use logical processor(s), memory, and I/O assigned by the VMM on the platform. Each TD may be cryptographically isolated in memory using at least one exclusive encryption key of the MKTME engine to encrypt the memory (holding code and/or data) associated with the TD.

In implementations of the disclosure, the VMM in the TD architecture may act as a host for the TDs and may have full control of the cores and other components of platform hardware 110. The VMM may assign software in a TD with logical processor(s). The VMM, however, may be restricted from accessing the TD's execution state on the assigned logical processor(s). Similarly, the VMM assigns physical memory 112 and I/O resources to the TDs but is not privy to access the memory state of a TD due to the use of separate encryption keys enforced by the CPUs per TD, and other integrity and replay controls on memory. Software executing in a TD operates with reduced privileges so that the VMM can retain control of platform resources. However, the VMM cannot affect the confidentiality or integrity of the TD state in memory or in the CPU structures under defined circumstances.

Conventional systems providing isolation in virtualized systems do not extract the CSP software out of the tenant's TCB completely. Furthermore, conventional systems may increase the TCB significantly using separate chipset subsystems that implementations of the disclosure may avoid. In some cases, the TD architecture may provide isolation between customer (tenant) workloads and CSP software by explicitly reducing the TCB by removing the CSP software from the TCB. Implementations provide a technical improvement over conventional systems by providing secure isolation for CSP customer workloads (tenant TDs) and allow for the removal of CSP software from a customer's TCB while meeting security and functionality requirements of the CSP. In addition, the TD architecture is scalable to multiple TDs, which can support multiple tenant workloads. Furthermore, the TD architecture described herein is generic and can be applied to any dynamic random-access memory (DRAM), or storage class memory (SCM)-based memory, such as Non-Volatile Dual In-line Memory Module (NV-DIMM). As such, implementations of the disclosure allow software to take advantage of performance benefits, such as NVDIMM direct access storage (DAS) mode for SCM, without compromising platform security requirements.

Figure 2:
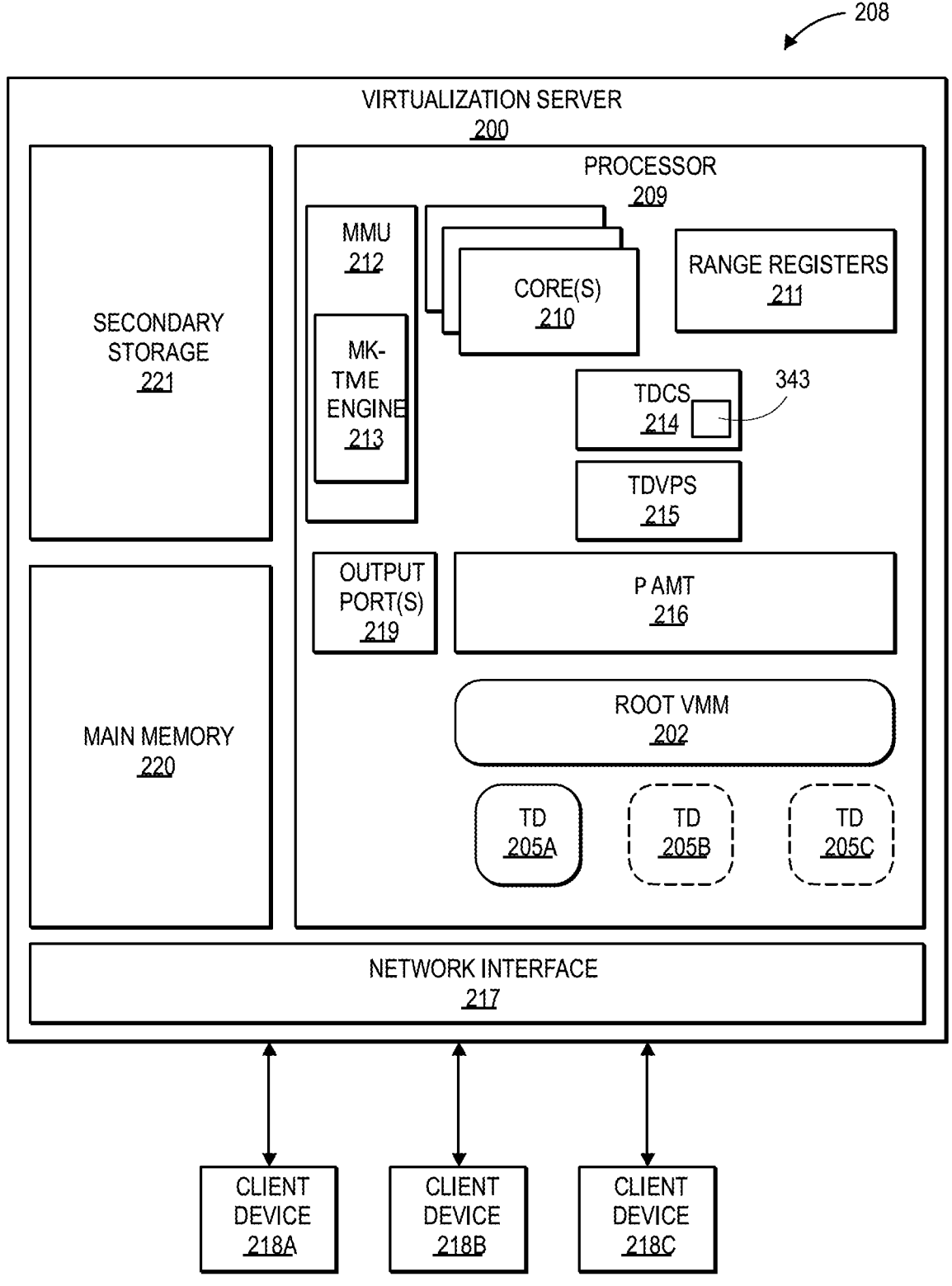
FIG. 2 is a block diagram illustrating an example computing system that provides isolation in virtualized systems using trust domains according to one implementation.

FIG. 2 is a schematic block diagram of a computing system 208 that provides isolation in virtualized systems using TDs, according to an implementation of the disclosure. The virtualization system includes a virtualization server 200 (which may be an implementation of computing system 100) that supports client devices 218A-218C. The virtualization server 200 includes at least one processor 209 (also referred to as a processing device) that executes a root VMM 202 (which may be an implementation of VMM 106). The root VMM 202 may include a VMM (which may also be referred to as hypervisor and may be an instance of VMM 106) that may instantiate one or more TDs 205A-205C accessible by the client devices 218A-218C via a network interface 217. The client devices may include, but are not limited to, one or more of a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device.

A TD may refer to a tenant (e.g., customer) workload. The tenant workload can include an OS alone along with other ring-3 applications running on top of the OS or can include a VM running on top of a VMM along with other ring-3 applications, for example. In implementations of the disclosure, each TD may be cryptographically isolated in memory using a separate exclusive key for encrypting the memory (holding code and data) associated with the TD, and integrity-protecting the key against any tamper by the host software or host-controlled devices.

Figure 3:
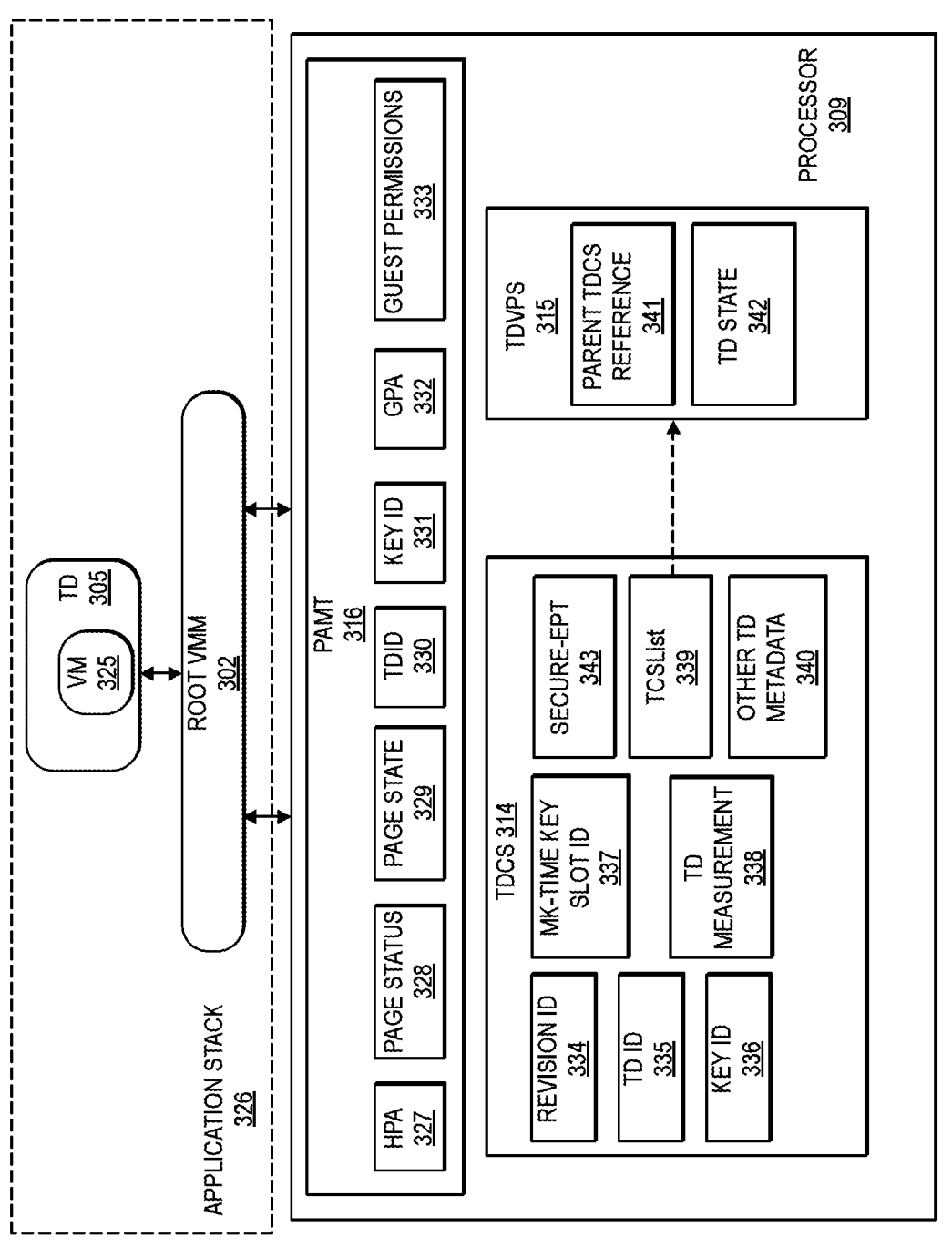
FIG. 3 is a block diagram illustrating another example computing system that provides isolation in virtualized systems using trust domains according to one implementation.

The processor 209 may include one or more cores 210, range registers 211, a memory management unit (MMU) 212, and output port(s) 219. FIG. 3 is a schematic block diagram of a detailed view of a processor core 210 executing a VMM 202 in communication with a PAMT 216 and secure-EPT 343 and one or more trust domain control structure(s) (TDCS(s)) 214 and trust domain virtual-processor control structure(s) (TDVPS(s)) 215, as shown in FIG. 2. TDVPS and TDVPX may be used interchangeable herein. The processor 209 may be used in a system that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another implementation, the processor 209 may be used in a SoC system.

The computing system 208 may be a server or other computer system having one or more processors available from Intel Corporation, AMD, Inc. or other processor developer, although the scope of the technology described herein is not so limited. In one implementation, sample system 208 executes a version of the WINDOWSTM operating system available from Microsoft Corporation of Redmond, Wash., although other operating systems (UNIX and Linux for example), embedded software, and/or graphical user interfaces, may also be used. Thus, implementations of the disclosure are not limited to any specific combination of hardware circuitry and software.

The one or more processing cores 210 execute instructions of the system. The processing core 210 includes, but is not limited to, pre-fetch circuitry to fetch instructions, decode circuitry to decode the instructions, execution circuitry to execute instructions and the like. In an implementation, the computing system 208 includes a component, such as the processor 209 to employ execution units including circuitry to perform processes for processing data.

Virtualization server 200 includes a main memory 220 and a secondary storage 221 to store program binaries and OS driver events. Data in the secondary storage 221 may be stored in blocks referred to as pages, and each page may correspond to a set of physical memory addresses. The virtualization server 200 may employ virtual memory management in which applications run by the core(s) 210, such as the TDs 205A-205C, use virtual memory addresses that are mapped to guest physical memory addresses, and guest physical memory addresses are mapped to host/system physical addresses by a MMU 212.

The core 210 may use the MMU 212 to load pages from the secondary storage 221 into the main memory 220 (which includes a volatile memory and/or a non-volatile memory) for faster access by software running on the processor 209 (e.g., on the core). When one of the TDs 205A-205C attempts to access a virtual memory address that corresponds to a physical memory address of a page loaded into the main memory, the MMU returns the requested data. The core 210 may execute the VMM portion of root VMM 202 to translate guest physical addresses to host physical addresses of main memory and provide parameters for a protocol that allows the core to read, walk and interpret these mappings.

In one implementation, processor 209 implements a TD architecture and ISA extensions (SEAM) for the TD architecture. The SEAM architecture and the TDX-Module running in SEAM mode to provide isolation between TD workloads 205A-205C and from CSP software (e.g., a CSP VMM (e.g., root VMM 202)) executing on the processor 209). Components of the TD architecture can include 1) memory encryption, integrity and replay-protection via an MKTME engine 213; 2) a resource management capability referred to herein as the VMM 202; and 3) execution state and memory isolation capabilities in the processor 209 provided via a PAMT 216 and secure-EPT 343 and via access-controlled confidential TD control structures (e.g., TDCS 214 and TDVPS 215). The TDX architecture provides an ability of the processor 209 to deploy TDs 205A-205C that leverage the MKTME engine 213, the PAMT 216 and Secure-EPT 216, and the access-controlled TD control structures (i.e., TDCS 214 and TDVPS 215) for secure operation of TD workloads 205A-205C.

In implementations of the disclosure, the root VMM 202 acts as a host and has control of the cores 210 and other platform hardware. A VMM assigns software in a TD 205A-205C with logical processor(s). The VMM, however, cannot access a TD's execution state on the assigned logical processor(s). Similarly, a VMM assigns physical memory and I/O resources to the TDs but is not privy to access the memory state of the TDs due to separate encryption keys, and other integrity and replay controls on memory.

With respect to the separate encryption keys, the processor may utilize the MKTME engine 213 to encrypt (and decrypt) memory used during execution. With TME, any memory accesses by software executing on the core 210 can be encrypted in memory with an encryption key. MKTME is an enhancement to TME that allows use of multiple encryption keys. The processor 209 may utilize the MKTME engine to cause different pages to be encrypted using different MKTME keys. The MKTME engine 213 may be utilized in the TD architecture described herein to support one or more encryption keys per each TD 205A-205C to help achieve the cryptographic isolation between different CSP customer workloads. For example, when MKTME engine is used in the TD architecture, the CPU enforces by default that TD (all pages) are to be encrypted using a TD-specific key. Furthermore, a TD may further choose specific TD pages to be plain text or encrypted using different ephemeral keys that are opaque to CSP software.

Each TD 205A-205C is a software environment that supports a software stack consisting of VMMs (e.g., using virtual machine extensions (VMX)), OSes, and/or application software (hosted by the OS). Each TD may operate largely independently of other TDs and use logical processor(s), memory, and I/O assigned by the VMM 202 on the platform. Software executing in a TD operates with reduced privileges so that the VMM can retain control of platform resources; however, the VMM cannot affect the confidentiality or integrity of the TD under defined circumstances. Further details of the TD architecture and TDX are described in more detail below with reference to FIG. 3.

Computing system 208 includes a main memory 220. Main memory includes a DRAM device, a static random-access memory (SRAM) device, flash memory device, or other memory device. Main memory stores instructions and/or data represented by data signals that are to be executed by the processor 209. The processor may be coupled to the main memory via a processing device bus. A system logic chip, such as a memory controller hub (MCH) may be coupled to the processing device bus and main memory. An MCH can provide a high bandwidth memory path to main memory for instruction and data storage and for storage of graphics commands, data and textures. The MCH can be used to direct data signals between the processor, main memory, and other components in the system and to bridge the data signals between processing device bus, memory, and system I/O, for example. The MCH may be coupled to memory through a memory interface. In some implementations, the system logic chip can provide a graphics port for coupling to a graphics controller through an Accelerated Graphics Port (AGP) interconnect.

Computing system 208 may also include an I/O controller hub (ICH). The ICH can provide direct connections to some I/O devices via a local I/O bus. The local I/O bus is a high-speed I/O bus for connecting peripherals to the memory 220, chipset, and processor 209. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

With reference to FIG. 3, this figure depicts a block diagram of a processor 309 suitable for the processor 209 of FIG. 2, according to one implementation of the disclosure. In one implementation, the processor may execute an application stack 326 via a single core 210 or across several cores 210. As discussed above, the processor may provide a TD architecture and TDX to provide confidentiality (and integrity) for customer software running in the customer/tenants (i.e., TDs 205A) in an untrusted cloud service providers (CSP) infrastructure. The TD architecture provides for: memory isolation via a PAMT 316 and Secure-EPT 343; CPU state isolation that incorporates CPU key management via TDCS 314 and/or TDVPS 315; and CPU measurement infrastructure for TD 205A software.

In one implementation, TD architecture provides ISA extensions (referred to as TDX) that support confidential operation of OS and OS-managed applications (virtualized and non-virtualized). A platform, such as one including processor 209, with TDX enabled can function as multiple encrypted contexts referred to as TDs. For ease of explanation, a single TD 305 is depicted in FIG. 3. Each TD can run VMMs, VMs, OSes, and/or applications. For example, TD 305 is depicted as hosting a VMM and two VMs.

In one implementation, the VMM 202 may be included as part of VMM functionality (e.g., root VMM). A VMM may refer to software, firmware, or hardware to create, run, and manage virtual machines (VMs). It should be noted that the VMM may create, run, and manage one or more VMs. The VMM may create and run the VM and allocate one or more virtual processors (e.g., vCPUs) to the VM. The VM may also be referred to as guest herein. The VMM may allow the VM to access hardware of the underlying computing system, such as computing system 208 of FIG. 2. The VM may execute a guest operating system (OS). The VMM may manage the execution of the guest OS. The guest OS may function to control access of virtual processors of the VM to underlying hardware and software resources of the computing system. It should be noted that, when there are numerous VMs operating on the processing device, the VMM may manage each of the guest OSes executing on the numerous guests.

TDX also provides a programming interface for a TD management layer of the TD architecture referred to as the VMM 202. A VMM may be implemented as part of the CSP/root VMM. The VMM manages the operation of TDs 205A/B/C. While a VMM 202 can assign and manage resources, such as CPU, memory and input/output (I/O) to TDs, the VMM is designed to operate outside of a TCB of the TDs. The TCB of a system refers to a set of hardware, firmware, and/or software component that have an ability to influence the trust for the overall operation of the system.

In one implementation, the TD architecture is thus a capability to protect software running in a TD 205A. As discussed above, components of the TD architecture may include 1) Memory encryption via a TME engine having multi-key extensions to TME (e.g., MKTME engine 213 of FIG. 2), 2) a software resource management layer (VMM 202), and 3) execution state and memory isolation capabilities in the TD architecture.

The PAMT 316 and Secure-EPT 343 are structures, such tables, managed by the TDX module to enforce assignment of physical memory pages to executing TDs, such as TD 205A. The processor 209 also uses the PAMT and Secure-EPT to enforce that the physical addresses referenced by software operating as a tenant TD or the VMM cannot access memory not explicitly assigned to it. The PAMT and Secure-EPT enforces the following properties. First, software outside a TD should not be able to access (read/write/execute) in plaintext any memory belonging to a different TD (this includes the VMM). Second, memory pages assigned via the PAMT and Secure-EPT to specific TDs, such as TD, should be accessible from any processor in the system (where the processor is executing the TD that the memory is assigned to).

The PAMT and Secure-EPT structure is used to hold meta-data attributes for each 4 KB page of memory. Additional structures may be defined for additional page sizes (2 MB, 1 GB). The meta-data for each 4 KB page of memory is direct indexed by the physical page address. In other implementations, other page sizes may be supported by a hierarchical structure (like a page table). A 4 KB page referenced in the PAMT and Secure-EPT can belong to one running instance of a TD. 4 KB pages referenced in the PAMT and Secure-EPT can either be valid memory or marked as invalid (hence could be IO for example). In one implementation, each TD instance includes one page holding a TDCS for that TD.

In one implementation, the PAMT and Secure-EPT is aligned on a 4 KB boundary of memory and occupies a physically contiguous region of memory protected from access by software after platform initialization. In an implementation, the PAMT is a micro-architectural structure and cannot be directly accessed by software. The PAMT and Secure-EPT may store various security attributes for each 4 KB page of host physical memory.

The PAMT and Secure-EPT may be enabled when TDX is enabled in the processor (e.g., via CPUID-based enumeration). Once the PAMT and Secure-EPT is enabled, the PAMT and Secure-EPT can be used by the processor to enforce memory access control for all physical memory accesses initiated by software, including the VMM. In one implementation, the access control is enforced during the page walk for memory accesses made by software. Physical memory accesses performed by the processor to memory that is not assigned to a tenant TD or VMM fail with Abort page semantics.

A key identifier (ID) 331, 336 in TDX may be used to identify a portion of memory. When a key ID is zero, all memory is encrypted by MKTME engine 213 with the same key. When a key ID is not zero, a region of memory identified by the key ID is encrypted with a selected key by MKTME engine 213. In one implementation, an array of key IDs is implemented, with each slot in the array storing a key denoted by the key ID.

In the current TDX architecture, TME must be enabled, which encrypts all of memory and an encryption penalty is paid by all software running on the system. This results in increased performance overhead even for non-TD VMs, thereby increasing the TCO for the CSP as they cannot charge extra for the non-TD VMs.

The technology described herein provides an option to enable encryption only for TDX without requiring encryption of all of memory 112. This technology introduces a bypass mode for TME (or Key ID of zero when enabled with MKTME). In this bypass mode, a read access request with a Key ID of zero bypasses decryption while writes go through the encryption pipeline (without getting encrypted) to maintain memory ordering. Since writes are off the critical path, the added latency to maintain memory ordering with the bypass results in trivial overheads, allowing near zero overhead when in bypass mode. Non-confidential software uses Key ID of zero by default and hence has a near zero performance overhead for performance of the request.

The technology described herein de-couples TME from TDX (MKTME and SGX) enabling non-confidential VMs to run at native performance without taking on the overhead of memory encryption. The technology described herein introduces new software visible controls to allow bypassing TME. In one implementation, this new capability is enumerated in the TME capability model specific register called TME_CAPABILITY MSR 116 and activated by the BIOS 109 using the TME_ACTIVATE MSR 118.

FIG. 4 is a diagram of a memory encryption capability register (TME_CAPABILITY_MSR 116) according to one implementation. The TME_CAPABILITY_MSR 116 is an architectural MSR used to enumerate capabilities (such as number of keys, encryption processes used, etc.) of memory encryption hardware 114 (e.g., MKTME encryption engine 213). A TME encryption bypass supported flag is added as field 402 to indicate whether encryption bypass is supported when set. On platform hardware supporting the technology described herein, in one implementation, bit 31 in TME-_CAPABILITY MSR is set to indicate to software that TME encryption bypass is supported. Since the encryption capability is activated by BIOS 109, the BIOS 109 checks this bit to know whether the BIOS can set up TME in bypass mode or not.

FIG. 5 is a diagram of a memory encryption activation register (TME_ACTIVATE_MSR 118) according to one implementation. In TME ACTIVATE MSR, in one implementation, bit 1 502 now indicates enabling of memory encryption hardware 114 (e.g., MKTME 213). Memory encryption hardware can be used without TME being activated (or all of memory being encrypted). Bit 31 504 is repurposed to allow BIOS to select activation of bypassing of memory encryption for a selected portion of memory identified by a key ID.

When memory encryption hardware is not enabled, the capabilities of TME/MKTME/SGX/TDX are not enabled. When memory encryption hardware is enabled, microcode in platform hardware (e.g., processor 209) programs a TME key algorithm based on TME encryption bypass enable 504 (bit 31). The software (e.g., one or operating system (OS), hypervisor, or virtual machine manager (VMM)) of computing system 100 inspects bit 1 502 and bit 31 504 in TME_ACTIVATE MSR to determine if TME encryption is enabled (TME_ENABLED=TME_ACTIVATE_MSR.BIT [1] & ~TME_ACTIVATE_MSR.BIT[31]). Table 1 below summarizes these changes to TME ACTIVATE flow in processor microcode to enable the technology described herein.

TABLE 1

| Hardware Encryption Enable (Bit 1) | TME Encryption Bypass Enable (Bit 31) | Microcode actions |
|---|---|---|
| 0 | 0/1 | Memory encryption hardware not enabled |
| 1 | 0 | Memory encryption hardware enabled, no changes to TME key behavior, TME key programmed to encrypt with hardware generated key |
| 1 | 1 | Memory encryption hardware enabled, TME key programmed in bypass mode at TME activate time |

BIOS 109 exposes TME encryption bypass as an option with MKTME/SGX/TDX enabling options when TME encryption bypass is supported. Additionally, BIOS 109 stores this setting in case a restore across standby is selected.

Figure 6:
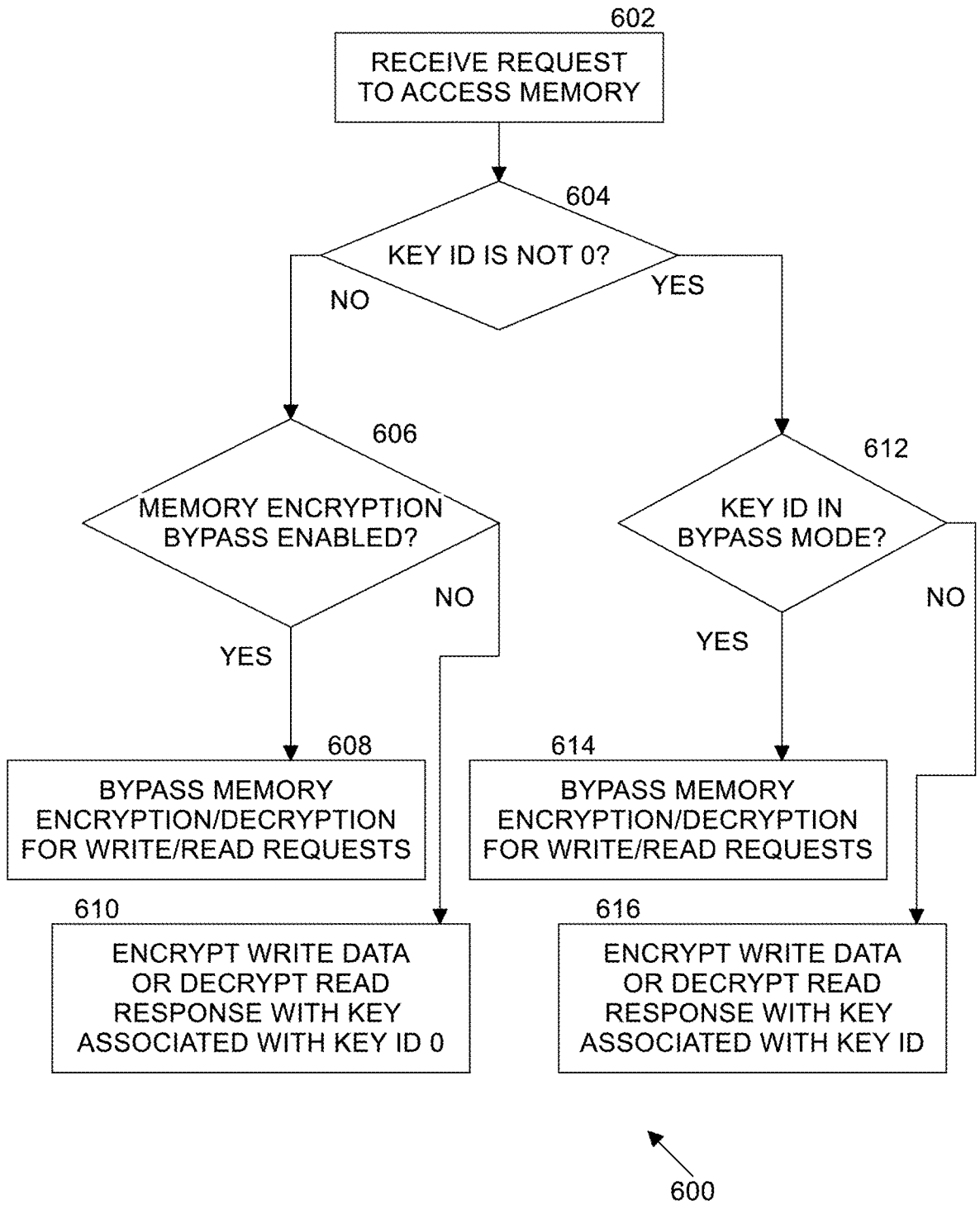
FIG. 6 is a flow diagram of memory encryption bypass processing according to one implementation.

FIG. 6 is a flow diagram of memory encryption bypass processing 600 according to one implementation. At block 602, a request to access memory 112 is received by memory encryption hardware 114 (e.g., MK-TME 213). The request includes a Key ID. If the request has a Key ID of a non-zero value at block 604, then processing continues with block 612, where memory encryption hardware 114 determines if the memory portion identified by the Key ID is in bypass mode. In one implementation this is indicated by the hardware encryption enable bit. If so, then at block 614, memory encryption hardware bypasses data encryption if the request is a write request and bypasses memory decryption if the request is a read request. If not, at block 616 memory encryption hardware encrypts write data for a write request or decrypts a read response for a read request, with the key associated with the Key ID. At block 604, if the request has a Key ID that is zero, then processing continues with block 606. At block 606, memory encryption hardware 114 determines if memory encryption bypass is enabled. In one implementation, this is performed by checking bit 31 504 (TME encryption bypass enable field) of TME_ACTIVATE_MSR 118. If so, at block 608 memory encryption hardware 114 bypasses data encryption if the request is a write request and bypasses memory decryption if the request is a read request. If not (memory bypass encryption is disabled), at block 610 memory encryption hardware 114 encrypts write data for a write request or decrypts a read response for a read request, with the key associated with the Key ID=0. Note that if any Key ID greater than zero is set to a default value (e.g., to behave like Key ID=0) by TME processing, requests will also get bypassed if TME is enabled to be bypassed.

Exemplary Computer Architectures

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 7:
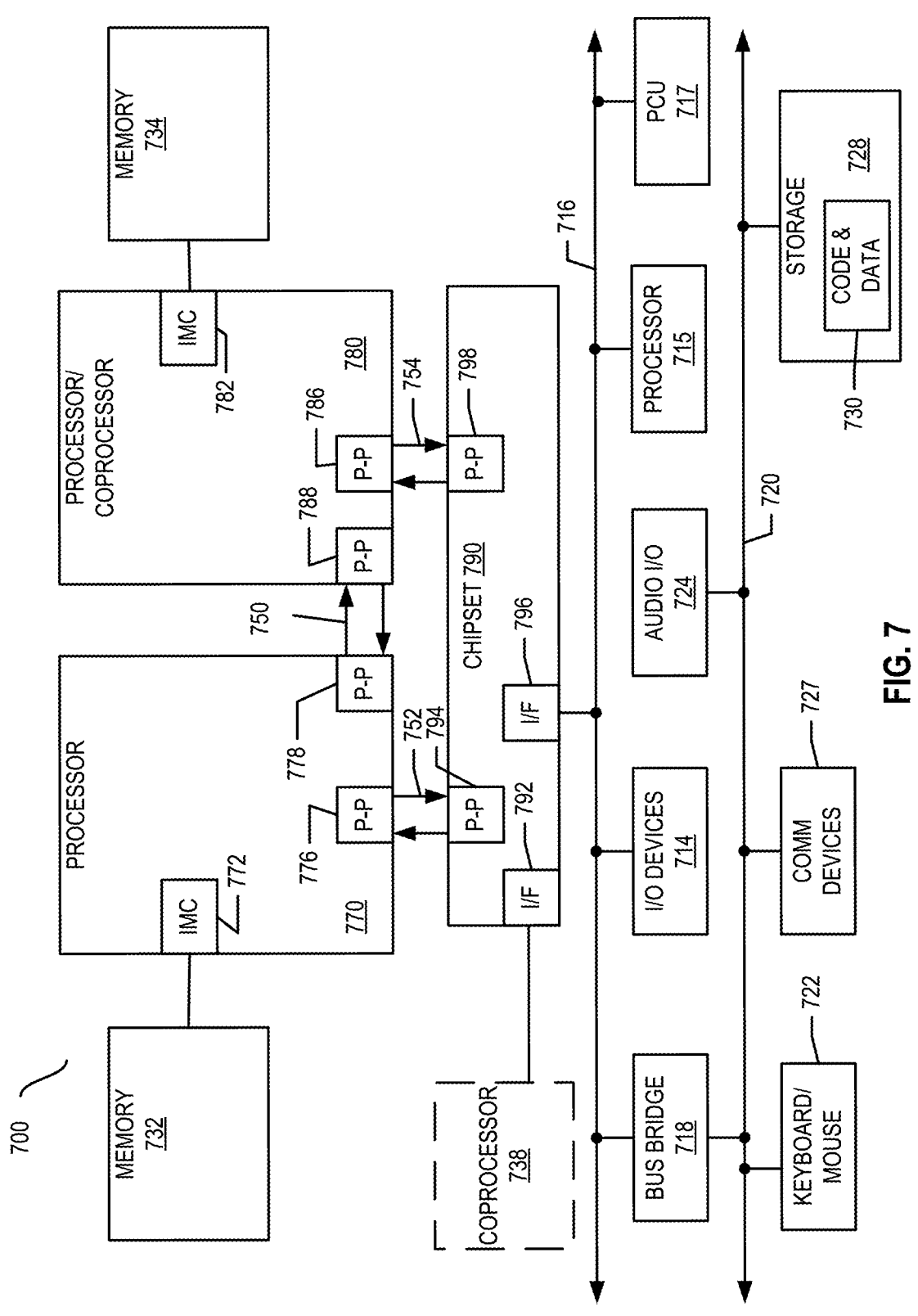
FIG. 7 illustrates an exemplary system.

FIG. 7 illustrates an exemplary system. Multiprocessor system 700 is a point-to-point interconnect system and includes a plurality of processors including a first processor 770 and a second processor 780 coupled via a point-to-point interconnect 750. In some examples, the first processor 770 and the second processor 780 are homogeneous. In some examples, first processor 770 and the second processor 780 are heterogenous.

Processors 770 and 780 are shown including integrated memory controller (IMC) unit circuitry 772 and 782, respectively. Processor 770 also includes as part of its interconnect controller unit point-to-point (P-P) interfaces 776 and 778; similarly, second processor 780 includes P-P interfaces 786 and 788. Processors 770, 780 may exchange information via the point-to-point (P-P) interconnect 750 using P-P interface circuits 778, 788. IMCs 772 and 782 couple the processors 770, 780 to respective memories, namely a memory 732 and a memory 734, which may be portions of main memory locally attached to the respective processors.

Processors 770, 780 may each exchange information with a chipset 790 via individual P-P interconnects 752, 754 using point to point interface circuits 776, 794, 786, 798. Chipset 790 may optionally exchange information with a co-processor 738 via a high-performance interface 792. In some examples, the co-processor 738 is a special-purpose processor, such as, for example, a high-throughput processor, a network or communication processor, compression engine, graphics processor, general purpose graphics processing unit (GPGPU), embedded processor, or the like.

A shared cache (not shown) may be included in either processor 770, 780 or outside of both processors, yet connected with the processors via P-P interconnect, such that either or both processors' local cache information may be stored in the shared cache if a processor is placed into a low power mode.

Chipset 790 may be coupled to a first interconnect 716 via an interface 796. In some examples, first interconnect 716 may be a Peripheral Component Interconnect (PCI) interconnect, or an interconnect such as a PCI Express interconnect or another I/O interconnect. In some examples, one of the interconnects couples to a power control unit (PCU) 717, which may include circuitry, software, and/or firmware to perform power management operations with regard to the processors 770, 780 and/or co-processor 738. PCU 717 provides control information to a voltage regulator (not shown) to cause the voltage regulator to generate the appropriate regulated voltage. PCU 717 also provides control information to control the operating voltage generated. In various examples, PCU 717 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 717 is illustrated as being present as logic separate from the processor 770 and/or processor 780. In other cases, PCU 717 may execute on a given one or more of cores (not shown) of processor 770 or 780. In some cases, PCU 717 may be implemented as a microcontroller (dedicated or general-purpose) or other control logic configured to execute its own dedicated power management code, sometimes referred to as P-code. In yet other examples, power management operations to be performed by PCU 717 may be implemented externally to a processor, such as by way of a separate power management integrated circuit (PMIC) or another component external to the processor. In yet other examples, power management operations to be performed by PCU 717 may be implemented within BIOS or other system software.

Various I/O devices 714 may be coupled to first interconnect 716, along with a bus bridge 718 which couples first interconnect 716 to a second interconnect 720. In some examples, one or more additional processor(s) 715, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interconnect 716. In some examples, second interconnect 720 may be a low pin count (LPC) interconnect. Various devices may be coupled to second interconnect 720 including, for example, a keyboard and/or mouse 722, communication devices 727 and a storage circuitry 728. Storage circuitry 728 may be a disk drive or other mass storage device which may include instructions/code and data 730, in some examples. Further, an audio I/O 724 may be coupled to second interconnect 720. Note that other architectures than the point-to-point architecture described above are possible. For example, instead of the point-to-point architecture, a system such as multiprocessor system 700 may implement a multi-drop interconnect or other such architecture. Exemplary Core Architectures, Processors, and Computer Architectures Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 8:
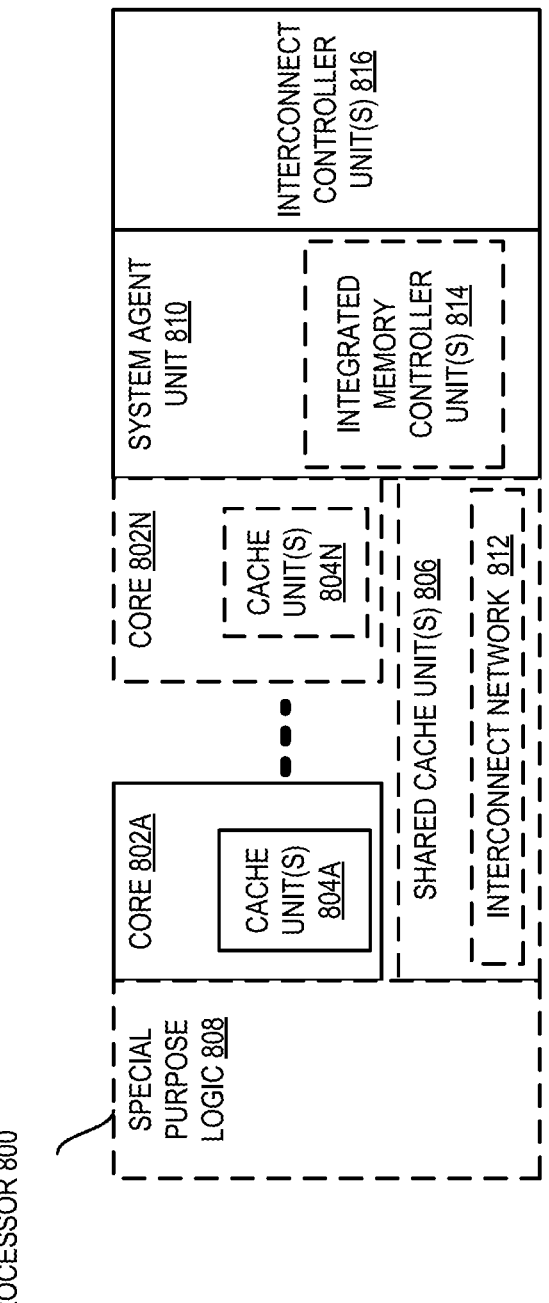
FIG. 8 illustrates a block diagram of an example processor that may have more than one core and an integrated memory controller.

FIG. 8 illustrates a block diagram of an example processor 800 that may have more than one core and an integrated memory controller. The solid lined boxes illustrate a processor 800 with a single core 802A, a system agent 810, a set of one or more interconnect controller unit(s) circuitry 816, while the optional addition of the dashed lined boxes illustrates an alternative processor 800 with multiple cores 802(A)-(N), a set of one or more integrated memory controller unit(s) circuitry 814 in the system agent unit circuitry 810, and special purpose logic 808, as well as a set of one or more interconnect controller units circuitry 816. Note that the processor 800 may be one of the processors 770 or 780, or co-processor 738 or 715 of FIG. 7.

Thus, different implementations of the processor 800 may include: 1) a CPU with the special purpose logic 808 being integrated graphics and/or scientific (throughput) logic (which may include one or more cores, not shown), and the cores 802(A)-(N) being one or more general purpose cores (e.g., general purpose in-order cores, general purpose out-of-order cores, or a combination of the two); 2) a coprocessor with the cores 802(A)-(N) being a large number of special purpose cores intended primarily for graphics and/or scientific (throughput); and 3) a coprocessor with the cores 802(A)-(N) being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, bipolar complementary metal oxide semiconductor (CMOS) (BiCMOS), CMOS, or N-type metal oxide semiconductor (NMOS).

A memory hierarchy includes one or more levels of cache unit(s) circuitry 804(A)-(N) within the cores 802(A)-(N), a set of one or more shared cache unit(s) circuitry 806, and external memory (not shown) coupled to the set of integrated memory controller unit(s) circuitry 814. The set of one or more shared cache unit(s) circuitry 806 may include one or more mid-level caches, such as level 2 (L2), level 3 (L3), level 4 (L4), or other levels of cache, such as a last level cache (LLC), and/or combinations thereof While in some examples ring-based interconnect network circuitry 812 interconnects the special purpose logic 808 (e.g., integrated graphics logic), the set of shared cache unit(s) circuitry 806, and the system agent unit circuitry 810, alternative examples use any number of well-known techniques for interconnecting such units. In some examples, coherency is maintained between one or more of the shared cache unit(s) circuitry 806 and cores 802(A)-(N).

In some examples, one or more of the cores 802(A)-(N) are capable of multi-threading. The system agent unit circuitry 810 includes those components coordinating and operating cores 802(A)-(N). The system agent unit circuitry 810 may include, for example, power control unit (PCU) circuitry and/or display unit circuitry (not shown). The PCU may be or may include logic and components needed for regulating the power state of the cores 802(A)-(N) and/or the special purpose logic 808 (e.g., integrated graphics logic). The display unit circuitry is for driving one or more externally connected displays.

The cores 802(A)-(N) may be homogenous or heterogeneous in terms of architecture instruction set architecture (ISA); that is, two or more of the cores 802(A)-(N) may be capable of executing the same ISA, while other cores may be capable of executing only a subset of that ISA or a ISA.

Exemplary Core Architectures

Figure 9A:
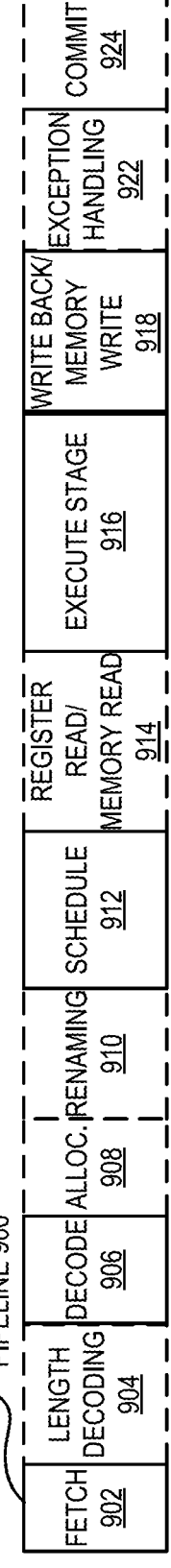
FIG. 9A is a block diagram illustrating both an exemplary in-order pipeline and an exemplary register renaming, out-of-order issue/execution pipeline according to examples.
Figure 9B:
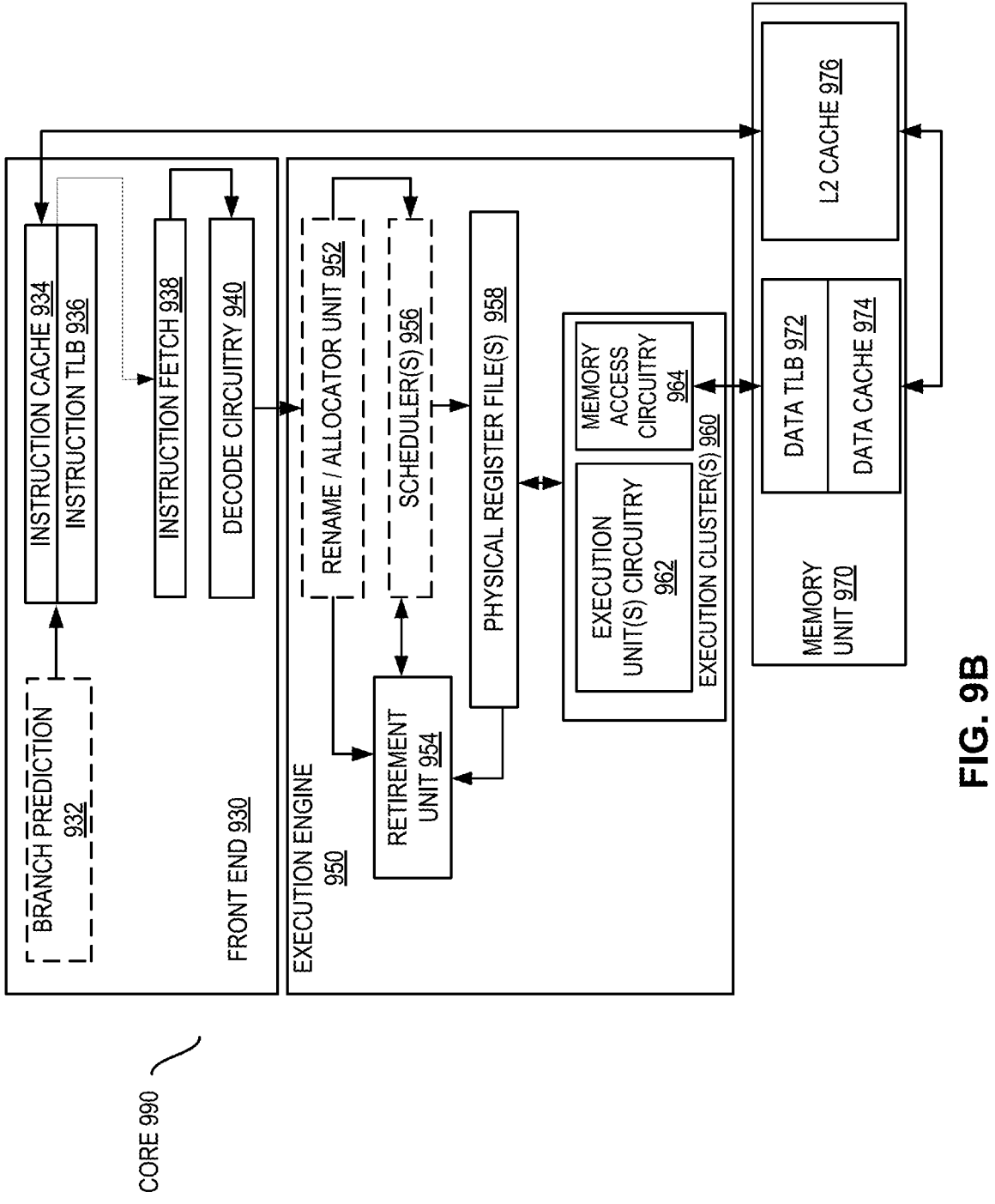
FIG. 9B is a block diagram illustrating both an exemplary example of an in-order architecture core and an exemplary register renaming, out-of-order issue/execution architecture core to be included in a processor according to examples.

FIG. 9(A) is a block diagram illustrating both an exemplary in-order pipeline and an exemplary register renaming, out-of-order issue/execution pipeline according to examples. FIG. 9(B) is a block diagram illustrating both an exemplary example of an in-order architecture core and an exemplary register renaming, out-of-order issue/execution architecture core to be included in a processor according to examples. The solid lined boxes in FIGS. 9(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9(A), a processor pipeline 900 includes a fetch stage 902, an optional length decoding stage 904, a decode stage 906, an optional allocation (Alloc) stage 908, an optional renaming stage 910, a schedule (also known as a dispatch or issue) stage 912, an optional register read/memory read stage 914, an execute stage 916, a write back/memory write stage 918, an optional exception handling stage 922, and an optional commit stage 924. One or more operations can be performed in each of these processor pipeline stages. For example, during the fetch stage 902, one or more instructions are fetched from instruction memory, during the decode stage 906, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 906 and the register read/memory read stage 914 may be combined into one pipeline stage. In one example, during the execute stage 916, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution core architecture may implement the pipeline 900 as follows: 1) the instruction fetch 938 performs the fetch and length decoding stages 902 and 904; 2) the decode circuitry 940 performs the decode stage 906; 3) the rename/allocator unit circuitry 952 performs the allocation stage 908 and renaming stage 910; 4) the scheduler(s) circuitry 956 performs the schedule stage 912; 5) the physical register file(s) circuitry 958 and the memory unit circuitry 970 perform the register read/memory read stage 914; the execution cluster(s) 960 perform the execute stage 916; 6) the memory unit circuitry 970 and the physical register file(s) circuitry 958 perform the write back/memory write stage 918; 7) various circuitry may be involved in the exception handling stage 922; and 8) the retirement unit circuitry 954 and the physical register file(s) circuitry 958 perform the commit stage 924.

FIG. 9(B) shows processor core 990 including front-end unit circuitry 930 coupled to an execution engine unit circuitry 950, and both are coupled to a memory unit circuitry 970. The core 990 may be a reduced instruction set architecture computing (RISC) core, a complex instruction set architecture computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit circuitry 930 may include branch prediction circuitry 932 coupled to an instruction cache circuitry 934, which is coupled to an instruction translation lookaside buffer (TLB) 936, which is coupled to instruction fetch circuitry 938, which is coupled to decode circuitry 940. In one example, the instruction cache circuitry 934 is included in the memory unit circuitry 970 rather than the front-end circuitry 930. The decode circuitry 940 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 940 may further include an address generation unit circuitry (AGU, not shown). In one example, the AGU generates an LSU address using forwarded register ports, and may further perform branch forwarding (e.g., immediate offset branch forwarding, LR register branch forwarding, etc.). The decode circuitry 940 may be implemented using various different mechanisms. Examples of suitable mechanisms include, but are not limited to, look-up tables, hardware implementations, programmable logic arrays (PLAs), microcode read only memories (ROMs), etc. In one example, the core 990 includes a microcode ROM (not shown) or other medium that stores microcode for certain macroinstructions (e.g., in decode circuitry 940 or otherwise within the front end circuitry 930). In one example, the decode circuitry 940 includes a micro-operation (micro-op) or operation cache (not shown) to hold/cache decoded operations, micro-tags, or micro-operations generated during the decode or other stages of the processor pipeline 900. The decode circuitry 940 may be coupled to rename/allocator unit circuitry 952 in the execution engine circuitry 950.

The execution engine circuitry 950 includes the rename/allocator unit circuitry 952 coupled to a retirement unit circuitry 954 and a set of one or more scheduler(s) circuitry 956. The scheduler(s) circuitry 956 represents any number of different schedulers, including reservations stations, central instruction window, etc. In some examples, the scheduler(s) circuitry 956 can include arithmetic logic unit (ALU) scheduler/scheduling circuitry, ALU queues, arithmetic generation unit (AGU) scheduler/scheduling circuitry, AGU queues, etc. The scheduler(s) circuitry 956 is coupled to the physical register file(s) circuitry 958. Each of the physical register file(s) circuitry 958 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 958 includes vector registers unit circuitry, writemask registers unit circuitry, and scalar register unit circuitry. These register units may provide architectural vector registers, vector mask registers, general-purpose registers, etc. The physical register file(s) circuitry 958 is overlapped by the retirement unit circuitry 954 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 954 and the physical register file(s) circuitry 958 are coupled to the execution cluster(s) 960. The execution cluster(s) 960 includes a set of one or more execution unit(s) circuitry 962 and a set of one or more memory access circuitry 964. The execution unit(s) circuitry 962 may perform various arithmetic, logic, float-ing-point or other types of operations (e.g., shifts, addition, subtraction, multiplication) and on various types of data (e.g., scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execu-tion unit circuitry that all perform all functions. The sched-uler(s) circuitry 956, physical register file(s) circuitry 958, and execution cluster(s) 960 are shown as being possibly plural because certain examples create separate pipelines for certain types of data/operations (e.g., a scalar integer pipe-line, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 964). It should also be understood that where separate pipelines are used, one or more of these pipelines may be out-of-order issue/execution and the rest in-order.

In some examples, the execution engine unit circuitry 950 may perform load store unit (LSU) address/data pipelining to an Advanced Microcontroller Bus (AMB) interface (not shown), and address phase and writeback, data phase load, store, and branches.

The set of memory access circuitry 964 is coupled to the memory unit circuitry 970, which includes data TLB cir-cuitry 972 coupled to a data cache circuitry 974 coupled to a level 2 (L2) cache circuitry 976. In one exemplary example, the memory access circuitry 964 may include a load unit circuitry, a store address unit circuit, and a store data unit circuitry, each of which is coupled to the data TLB circuitry 972 in the memory unit circuitry 970. The instruc-tion cache circuitry 934 is further coupled to a level 2 (L2) cache circuitry 976 in the memory unit circuitry 970. In one example, the instruction cache 934 and the data cache 974 are combined into a single instruction and data cache (not shown) in L2 cache circuitry 976, a level 3 (L3) cache circuitry (not shown), and/or main memory. The L2 cache circuitry 976 is coupled to one or more other levels of cache and eventually to a main memory.

The core 990 may support one or more instructions sets (e.g., the x86 instruction set architecture (with some exten-sions that have been added with newer versions); the MIPS instruction set architecture; the ARM instruction set archi-tecture (with optional additional extensions such as NEON)), including the instruction(s) described herein. In one example, the core 990 includes logic to support a packed data instruction set architecture extension (e.g., AVX1, AVX2), thereby allowing the operations used by many multimedia applications to be performed using packed data.

Exemplary Execution Unit(s) Circuitry

Figure 10:
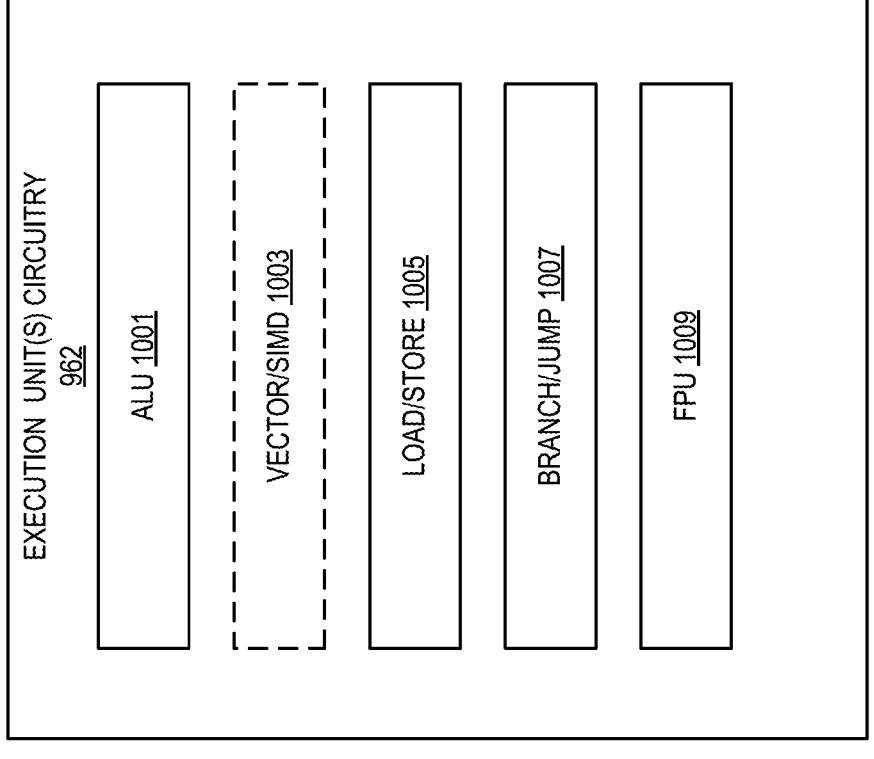
FIG. 10 illustrates examples of execution unit(s) circuitry, such as the execution unit(s) circuitry of FIG. 9(B).

FIG. 10 illustrates examples of execution unit(s) circuitry, such as execution unit(s) circuitry 962 of FIG. 9(B). As illustrated, execution unit(s) circuity 962 may include one or more ALU circuits 1001, vector/single instruction multiple data (SIMD) circuits 1003, load/store circuits 1005, and/or branch/jump circuits 1007. ALU circuits 1001 perform integer arithmetic and/or Boolean operations. Vector/SIMD circuits 1003 perform vector/SIMD operations on packed data (such as SIMD/vector registers). Load/store circuits 1005 execute load and store instructions to load data from memory into registers or store from registers to memory. Load/store circuits 1005 may also generate addresses. Branch/jump circuits 1007 cause a branch or jump to a memory address depending on the instruction. Floating-point unit (FPU) circuits 1009 perform floating-point arith-metic. The width of the execution unit(s) circuitry 962 varies depending upon the example and can range from 16-bit to 1,024-bit. In some examples, two or more smaller execution units are logically combined to form a larger execution unit (e.g., two 128-bit execution units are logically combined to form a 256-bit execution unit).

Exemplary Register Architecture

Figure 11:
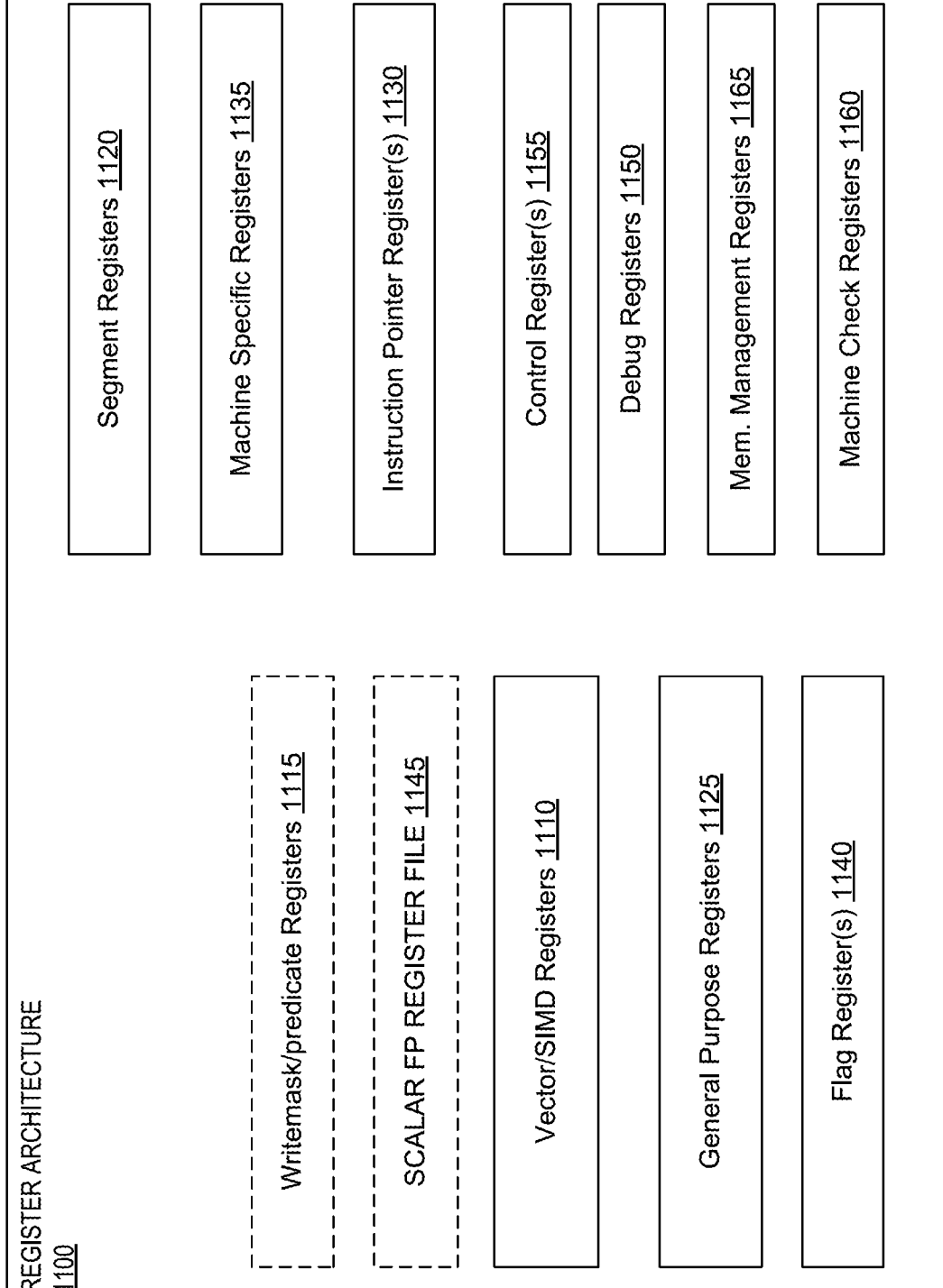
FIG. 11 is a block diagram of a register architecture according to some examples.

FIG. 11 is a block diagram of a register architecture 1100 according to some examples. As illustrated, there are vector/ SIMD registers 1110 that vary from 128-bit to 1,024 bits width. In some examples, the vector/SIMD registers 1110 are physically 512-bits and, depending upon the mapping, only some of the lower bits are used. For example, in some examples, the vector/SIMD registers 1110 are ZMM regis-ters which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1100 includes writemask/predicate registers 1115. For example, in some examples, there are 8 writemask/predicate registers (some-times called k0 through k7) that are each 16-bit, 32-bit, 64-bit, or 128-bit in size. Writemask/predicate registers 1115 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/ predicate register 1115 corresponds to a data element posi-tion of the destination. In other examples, the writemask/ predicate registers 1115 are scalable and consists of a set number of enable bits for a given vector element (e.g., 8 enable bits per 64-bit vector element).

The register architecture 1100 includes a plurality of general-purpose registers 1125. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1100 includes scalar floating-point (FP) register 1145 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1140 (e.g., EFLAGS, RFLAGS, etc.) store status and control information for arithmetic, compare, and system operations. For example, the one or more flag registers 1140 may store condition code information such as carry, parity, auxiliary carry, zero, sign, and overflow. In some examples, the one or more flag registers 1140 are called program status and control registers.

Segment registers 1120 contain segment points for use in accessing memory. In some examples, these registers are referenced by the names CS, DS, SS, ES, FS, and GS.

Model specific registers 1135 control and report on processor performance. Most model specific registers 1135 handle system-related functions and are not accessible to an application program. Machine check registers 1160 consist of control, status, and error reporting MSRs that are used to detect and report on hardware errors.

One or more instruction pointer register(s) 1130 store an instruction pointer value. Control register(s) 1155 (e.g., CR0-CR4) determine the operating mode of a processor (e.g., processor 770, 780, 738, 715, and/or 800) and the characteristics of a currently executing task. Debug registers 1150 control and allow for the monitoring of a processor or core's debugging operations.

Memory (mem) management registers 1165 specify the locations of data structures used in protected mode memory management. These registers may include a GDTR, IDRT, task register, and a LDTR register.

Alternative examples may use wider or narrower registers. Additionally, alternative examples may use more, less, or different register files and registers.

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (Including Binary Translation, Code Morphing, etc.)

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 12:
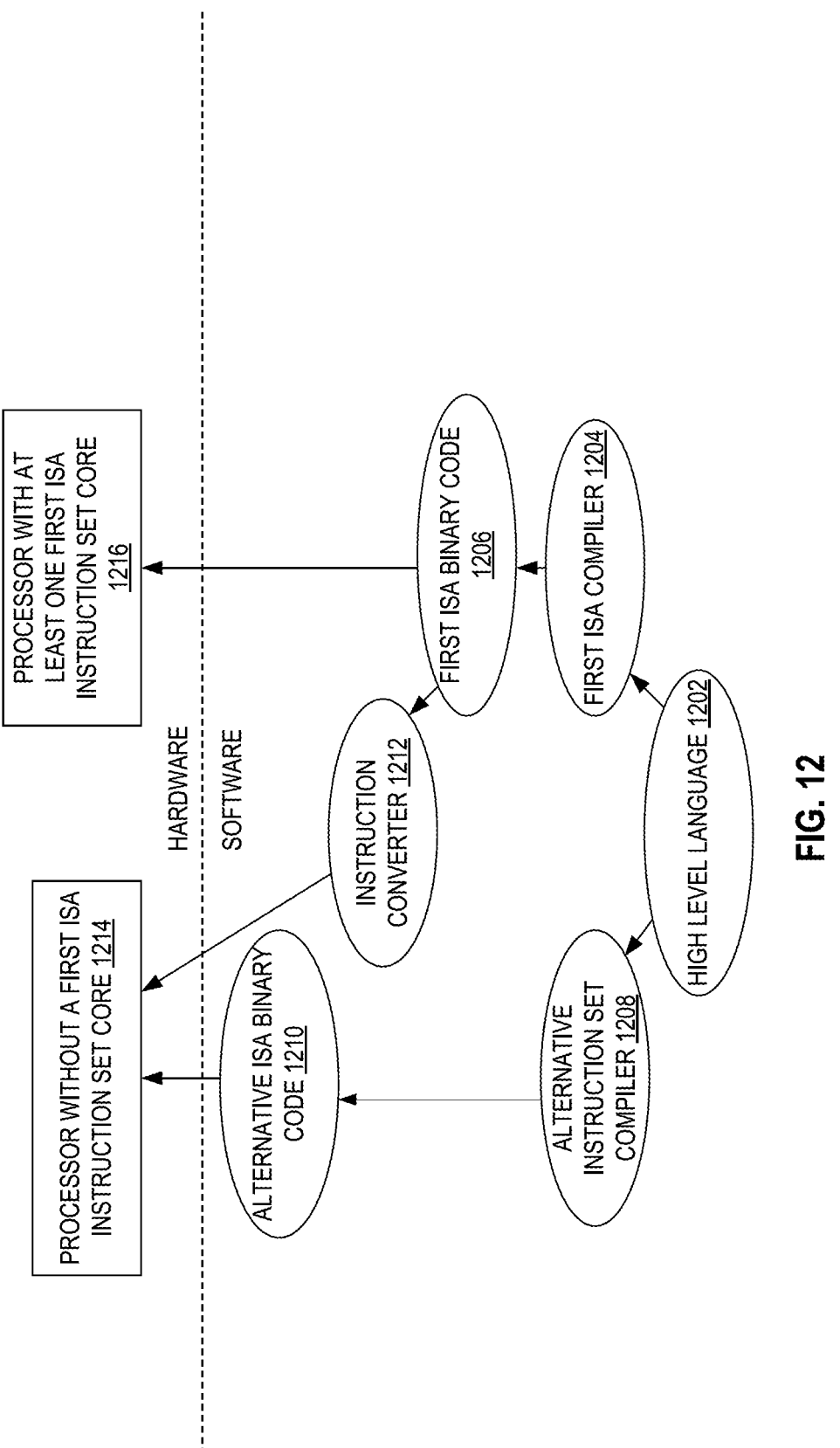
FIG. 12 illustrates a block diagram contrasting the use of a software instruction converter to convert binary instructions in a source instruction set architecture to binary instructions in a target instruction set architecture according to examples.

FIG. 12 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 12 shows a program in a high-level language 1202 may be compiled using a first ISA compiler 1204 to generate first ISA binary code 1206 that may be natively executed by a processor with at least one first instruction set architecture core 1216. The processor with at least one first ISA instruction set architecture core 1216 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 1204 represents a compiler that is operable to generate first ISA binary code 1206 (e.g., object code) that can, with or without additional linkage processing, be executed on the processor with at least one first ISA instruction set architecture core 1216. Similarly, FIG. 12 shows the program in the high-level language 1202 may be compiled using an alternative instruction set architecture compiler 1208 to generate alternative instruction set architecture binary code 1210 that may be natively executed by a processor without a first ISA instruction set architecture core 1214. The instruction converter 1212 is used to convert the first ISA binary code 1206 into code that may be natively executed by the processor without a first ISA instruction set architecture core 1214. This converted code is not likely to be the same as the alternative instruction set architecture binary code 1210 because an instruction converter capable of this is difficult to make; however, the converted code will accomplish the general operation and be made up of instructions from the alternative instruction set architecture. Thus, the instruction converter 1212 represents software, firmware, hardware, or a combination thereof that, through emulation, simulation or any other process, allows a processor or other electronic device that does not have a first ISA instruction set architecture processor or core to execute the first ISA binary code 1206.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

EXAMPLE EMBODIMENTS

The following examples pertain to further embodiments. Specifics in the examples may be used anywhere in one or more embodiments.

Example 1 is a processor including a first model specific register (MSR); and memory encryption circuitry to receive a request to access a memory, determine if a key identifier (ID) of the request is zero, and if the key ID is zero, to bypass data encryption when the request is to write data to the memory and to bypass memory decryption when the request is to read data from the memory and when a selected bit of the first MSR is set, and if the selected bit of the first MSR is not set, to encrypt write data when the request is to write data or decrypt data in a read response when the request is to read data, with a key associated with the key ID equal to zero.

In Example 2, the subject matter of Example 1 can optionally include wherein the request is received from a trust domain.

In Example 3, the subject matter of Example 1 can optionally include wherein the request is received from a non-confidential virtual machine.

In Example 4, the subject matter of Example 1 can optionally include wherein the key ID identifies a portion of the memory.

In Example 5, the subject matter of Example 1 can optionally include a second MSR and the memory encryption circuitry is to support bypass of memory encryption when a selected bit of the second MSR is set.

In Example 6, the subject matter of Example 5 can optionally include wherein the selected bit of the second MSR is set by a basic input/output system (BIOS).

In Example 7, the subject matter of Example 1 can optionally include wherein the first MSR is a total memory encryption activate MSR and the selected bit is a total memory encryption bypass enable field.

In Example 8, the subject matter of Example 1 can optionally include wherein the first MSR comprises a hardware encryption enable bit, and when the hardware encryption enable bit is set the processor programs the key in bypass mode when total memory encryption is activated.

Example 9 is a method including receiving, by a processor, a request to access a memory; determining if a key identifier (ID) of the request is zero, and if the key ID is zero, bypassing data encryption when the request is to write data to the memory and bypassing memory decryption when the request is to read data from the memory and when a selected bit of a first model specific register (MSR) is set, and if the selected bit of the first MSR is not set, encrypting write data when the request is to write data or decrypting data in a read response when the request is to read data, with a key associated with the key ID equal to zero.

In Example 10, the subject matter of Example 9 can optionally include wherein the key ID identifies a portion of the memory.

In Example 11, the subject matter of Example 9 can optionally include supporting bypass of memory encryption when a selected bit of a second MSR is set.

In Example 12, the subject matter of Example 11 can optionally include wherein the selected bit of the second MSR is set by a basic input/output system (BIOS).

In Example 13, the subject matter of Example 1 can optionally include wherein the first MSR is a total memory encryption activate MSR and the selected bit is a total memory encryption bypass enable field.

Example 14 is a system including a memory; a first model specific register (MSR); and memory encryption circuitry to receive a request to access the memory, determine if a key identifier (ID) of the request is zero, and if the key ID is zero, to bypass data encryption when the request is to write data to the memory and to bypass memory decryption when the request is to read data from the memory and when a selected bit of the first MSR is set, and if the selected bit of the first MSR is not set, to encrypt write data when the request is to write data or decrypt data in a read response when the request is to read data, with a key associated with the key ID equal to zero.

In Example 15, the subject matter of Example 14 can optionally include a trust domain to send the request to access the memory.

In Example 16, the subject matter of Example 14 can optionally include a non-confidential virtual machine to send the request to access the memory.

In Example 17, the subject matter of Example 14 can optionally include wherein the key ID identifies a portion of the memory.

In Example 18, the subject matter of Example 14 can optionally include a second MSR and the memory encryption circuitry is to support bypass of memory encryption when a selected bit of the second MSR is set.

In Example 19, the subject matter of Example 18 can optionally include a basic input/output system (BIOS) to set the selected bit of the second MSR.

In Example 20, the subject matter of Example 14 can optionally include wherein the first MSR comprises a hardware encryption enable bit, and when the hardware encryption enable bit is set, the key is set in bypass mode when total memory encryption is activated.

Example 21 is an apparatus operative to perform the method of any one of Examples 9 to 13.

Example 22 is an apparatus that includes means for performing the method of any one of Examples 9 to 13.

Example 23 is an apparatus that includes any combination of modules and/or units and/or logic and/or circuitry and/or means operative to perform the method of any one of Examples 9 to 13.

Example 24 is an optionally non-transitory and/or tangible machine-readable medium, which optionally stores or otherwise provides instructions that if and/or when executed by a computer system or other machine are operative to cause the machine to perform the method of any one of Examples 9 to 13.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A processor comprising:
a first model specific register (MSR); and
memory encryption circuitry to receive a request to write data to or read data from a memory; determine if a key identifier (ID) of the request is zero, wherein when the key ID is zero, all of the memory to be encrypted is to be encrypted with a first key associated with the key ID equal to zero, and when the key ID is not zero, a region of the memory identified by the key ID is to be encrypted with a second key different from the first key; determine if a selected bit of a first model specific register (MSR) is set; in response to determining that the key ID is zero and the selected bit of the first MSR is set, to bypass encryption of the write data or decryption of the read data; and in response to determining that the key ID is zero and the selected bit of the first MSR is not set, to encrypt the write data or decrypt the read data with the first key associated with the key ID equal to zero.

2. The processor of claim 1, wherein the request is received from a trust domain.

3. The processor of claim 1, wherein the request is received from a non- confidential virtual machine.

4. The processor of claim 1, wherein the key ID identifies a portion of the memory.

5. The processor of claim 1, comprising a second MSR and the memory encryption circuitry is to support bypass of memory encryption when a selected bit of the second MSR is set.

6. The processor of claim 5, wherein the selected bit of the second MSR is set by a basic input/output system (BIOS).

7. The processor of claim 1, wherein the first MSR is a total memory encryption activate MSR and the selected bit is a total memory encryption bypass enable field.

8. The processor of claim 1, wherein the first MSR comprises a hardware encryption enable bit, and when the hardware encryption enable bit is set the processor programs the key in bypass mode when total memory encryption is activated.

9. A method comprising:
receiving, by a processor, requests to write data to or read data from a memory;
determining a key identifier (ID) of a first request is zero;
determining a selected bit of a first model specific register (MSR) is set;
in response to determining that the key ID of the first request is zero and the selected bit of the first MSR is set, bypassing encryption of the write or decryption of the read data;
determining a key ID of a second request is zero;
determining the selected bit of the first MSR is not set;
in response to determining that the key ID of the second request is zero and the selected bit of the first MSR is not set, encrypting the write data or decrypting the read data with a first key associated with the key ID equal to zero, wherein all of the memory to be encrypted is to be encrypted with the first key;
determining a key identifier (ID) of a third request is not zero; and
in response to determining that the key ID of the third request is not zero, encrypting a region of the memory with a second key different from the first key.

10. The method of claim 9, wherein the key ID of the third request identifies a portion of the memory.

11. The method of claim 9, supporting bypass of memory encryption when a selected bit of a second MSR is set.

12. The method of claim 11, wherein the selected bit of the second MSR is set by a basic input/output system (BIOS).

13. The method of claim 9, wherein the first MSR is a total memory encryption activate MSR and the selected bit is a total memory encryption bypass enable field.

14. A system comprising:
a memory;
a first model specific register (MSR); and
memory encryption circuitry to receive a request to write data to or read data from the memory; determine if a key identifier (ID) of the request is zero, wherein when the key ID is zero, all of the memory to be encrypted is to be encrypted with a first key associated with the key ID equal to zero, and when the key ID is not zero, a region of the memory identified by the key ID is to be encrypted with a second key different from the first key; determine if a selected bit of the first model specific register (MSR) is set; in response to determining that the key ID is zero and the selected bit of the first MSR is set, to bypass encryption of the write data or decryption of the read data;
and in response to determining that the key ID is zero and the selected bit of the first MSR is not set, to encrypt the write data or decrypt the read data with the first key associated with the key ID equal to zero.

15. The system of claim 14, comprising a trust domain to send the request to access the memory.

16. The system of claim 14, comprising a non-confidential virtual machine to send the request to access the memory.

17. The system of claim 14, wherein the key ID identifies a portion of the memory.

18. The system of claim 14, comprising a second MSR and the memory encryption circuitry is to support bypass of memory encryption when a selected bit of the second MSR is set.

19. The system of claim 18, comprising a basic input/ output system (BIOS) to set the selected bit of the second MSR.

20. The system of claim 14, wherein the first MSR comprises a hardware encryption enable bit, and when the hardware encryption enable bit is set, the key is set in bypass mode when total memory encryption is activated.

*    *    *    *    *